United States Patent [19]
Perkins et al.

[11] Patent Number: 5,053,098
[45] Date of Patent: Oct. 1, 1991

[54] MANUFACTURE OF FLEXIBLE REINFORCED POLYMERIC ARTICLE

[75] Inventors: David J. B. Perkins, Liverpool; Colin Holroyd, Lancashire, both of England

[73] Assignee: Bridgestone/Firestone Inc., Akron, Ohio

[21] Appl. No.: 474,132

[22] PCT Filed: Nov. 14, 1988

[86] PCT No.: PCT/GB88/00988
§ 371 Date: May 1, 1990
§ 102(e) Date: May 1, 1990

[87] PCT Pub. No.: WO89/04251
PCT Pub. Date: May 18, 1989

[30] Foreign Application Priority Data

Nov. 13, 1987 [GB] United Kingdom ............... 8726664

[51] Int. Cl.$^5$ .............................................. B29C 67/14
[52] U.S. Cl. ...................................... 156/177; 28/102; 152/527; 156/440
[58] Field of Search ............... 152/527; 156/117, 121, 156/439, 440, 177; 66/126 R; 264/103; 28/100, 101, 102

[56] References Cited

U.S. PATENT DOCUMENTS

| | | | |
|---|---|---|---|
| 4,123,920 | 11/1978 | Bassist | 156/439 |
| 4,409,059 | 10/1983 | Holroyd et al. | 156/117 |
| 4,484,459 | 11/1984 | Hutson | 156/439 |

Primary Examiner—Michael W. Ball
Assistant Examiner—Francis J. Lorin
Attorney, Agent, or Firm—Sughrue, Mion, Zinn Macpeak & Seas

[57] ABSTRACT

In a method of an apparatus for the manufacture of a flexible reinforced polymeric article, such as a breaker fabric for a pneumatic tire, a layer of polymeric material is fed from feed means to a conveyor and a pair of laying head carriages are arranged to lay to and fro over said polymeric layer two reinforcing cords in an arrangement in which two successive transverse portions of one cord lie interdigitated between two successive transverse portions of the other cord in a manner whereby the two cords are free from overlapping crossover regions.

Means may be provided for applying a second layer of polymeric material whereby the cords are embedded between and consolidated in said polymeric layers.

17 Claims, 4 Drawing Sheets

MANUFACTURE OF FLEXIBLE REINFORCED POLYMERIC ARTICLE

This invention relates to a method of an apparatus for the manufacture of a flexible reinforced polymeric article and in particular though not exclusively to the manufacture of elongate breaker fabric for use in a pneumatic tire.

In accordance with one of its aspects the present invention provides a method for the manufacture of a reinforced polymeric article comprising feeding a layer of polymeric material to a conveyor, applying two flexible reinforcing elements to said layer of polymeric material whilst supported on the conveyor and laying a first of said reinforcing elements to extend successively to and fro across the polymeric material from a first edge region toward a second edge region of the conveyor and back to the first edge region, characterised in that the method further comprises laying a second of said reinforcing elements to extend successively to and fro across the polymeric material from the second edge region toward the first edge region and back to the second edge region, the two elements being laid in an arrangement in which portions of the second element are caused to lie in spaces between successive portions of the first element extending to and from said first edge region whereby successive portions of each element lie interdigitated with successive portions of the other element in a manner free of cross-over of the elements.

Preferably the reinforcing elements are laid at an angle in the range from 18-up to and including 90 degrees relative to the direction of movement of the conveyor.

It is further preferred that the reinforcing elements are laid across the layer of polymeric material whilst the conveyor is at rest, the conveyor being operated to advance the polymeric material in a carefully indexed step-wise manner only whilst the next portion of each element for laying on the polymeric material lies at an edge region of the conveyor.

The step-wise movement of the conveyor may be utilised to enable portions of each element to lie at edge regions in a direction parallel with the direction of movement of the conveyor.

The reinforcing elements may be covered by a second layer of polymeric material to form a reinforced article, such as a breaker ply fabric, in which the reinforcing elements are sandwiched between and embedded in two layers of polymeric material.

In a method involving use of two flexible reinforcing elements of corresponding size, the conveyor may be controlled to move in a step-wise manner alternately by a distance corresponding to three pitches of reinforcing element as measured in the direction of movement, and then by one pitch of the reinforcing element. In consequence there may be attained a uniform spacing of successive central portions of each reinforcing element in a central region of the polymeric article between the edge regions thereof.

In accordance with another of its aspects the present invention provides apparatus for the manufacture of a reinforced polymeric article comprising a conveyor for supporting a layer of polymeric material, feed means for supply of a layer of polymeric material to the conveyor, and laying head means operable to lay a first reinforcing element in a to and fro manner over a layer of polymeric material supported by the conveyor whereby the element extends in a direction at least a component of which lies tranverse relative to the direction of movement of the layer of polymeric material on the conveyor, characterised in that a second laying head means is provided and is operable to lay a second reinforcing element in said to and fro manner, two pairs of reinforcing element support means, each pair comprising two support means arranged one at each edtge of the conveyor and operatively associated with a respective laying head, and means to hold a reinforcing element at an edge region of the layer of polymeric material at least during a change in direction of lay of a reinforcing element by said laying head means.

The apparatus may additionally comprise a second feed means for supply of a second layer of polymeric material. This may be provided at a position downstream of the two laying head means.

Each reinforcing element support means may have associated therewith clamp means operable to secure a reinforcing element relative to an edge region of the layer of polymeric material when the element has been applied around a support means and said support means has been retracted to a position at which it no longer supports or positions the reinforcing element.

Each reinforcing element support means additionally or alternatively may have associated therewith a forming assembly selectively operable to urge a reinforcing element into firm contact with a support means. In the case of, say, a metallic cord reinforcing element the forming assembly may thereby impart a permanent set to the cord.

Each support means preferably is independently adjustable thereby to permit ready variation of the bias angle at which reinforcing elements are laid as well as accepting changes in width of the conveyor.

The conveyor may comprise a pair of endless belts arranged side-by-side. The lateral spacing of the belts may be adjustable having regard to the width of the polymeric article which it is desired to produce. The support means preferably are readily adjustable to lie close to the outer edges of the endless belts.

The apparatus preferably incorporates control means for the support means whereby said support means are advanced and retracted in sequence with movement of the laying head means.

The method and apparatus of the present invention are particularly suitable for the manufacture of a reinforced polymeric article the subject of our United Kingdom Patent Application Ser. No. 2 212 456A.

The above and further aspects of the present invention will be apparent from the description of an embodiment of the invention given below by way of example with reference to the accompanying drawings, in which.

Figure 1:
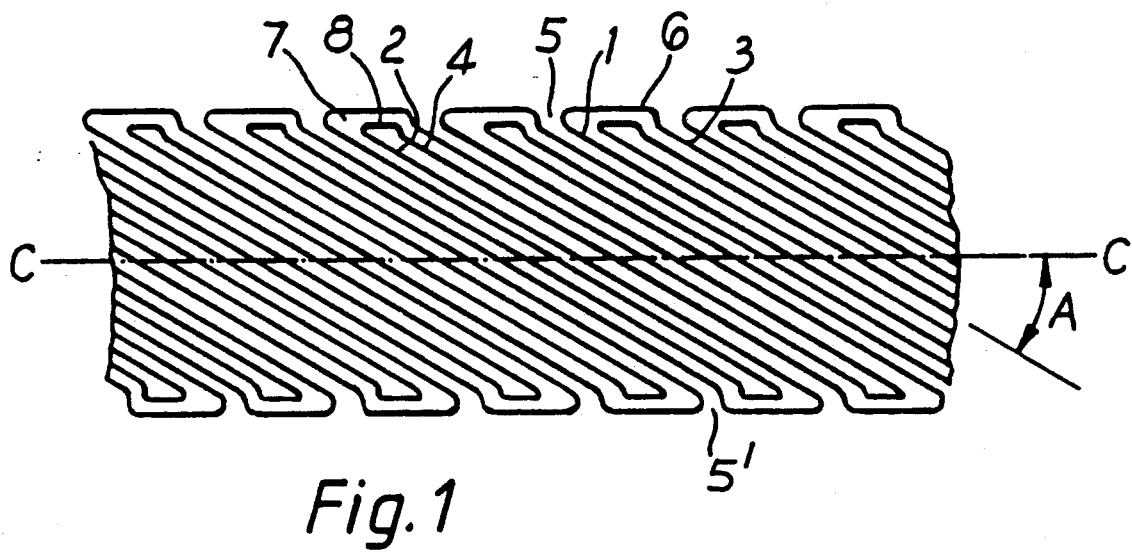
FIG. 1 is a fragmentary plan view of a preferred breaker fabric reinforcement.
Figure 2:
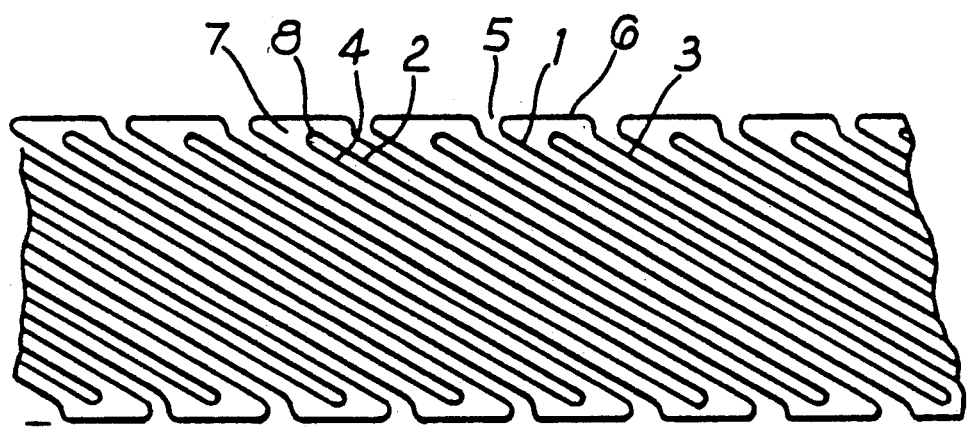
FIG. 2 is a fragmentary plan view of another breaker fabric reinforcement.
Figure 3:
FIG. 3 is a side view of the fabric reinforcements shown in FIGS. 1 and 2 impregnated with rubber.

Each of the breaker fabric reinforcements shown in FIGS. 1, 2 and 3 comprises an elongate arrangement of two parallel closely spaced steel wire reinforcement cords 1 and 2 laid at an acute angle of 21 degrees (see angle A in FIG. 1) relative to the longitudinal centre line C—C of the fabric.

The fabric reinforcement is formed by laying cords 1 and 2 in a zig-zag fashion such that when cord 1 reaches the edge 5 it is folded back on itself to run longitudinally, parallel with the centre line of the fabric over an intermediate, edge region marked 6 and then formed to follow the line marked 3.

In the FIG. 1 construction, when cord 2 reaches position 7 inside the area defined by cord 1 it is folded back on itself over an intermediate edge region marked 8 to run longitudinally over a short distance parallel with the centre line C—C of the fabric and parallel with an edge region 6 and then formed to follow the line marked 4. The cords 1, 2 follow a similar path at the edge 5' the other side of the centre line C—C.

In the FIG. 2 construction, the cord 2 follows a path essentially similar to that of cord 2 shown in FIG. 1 except at the position 7. Here it is folded back on itself, following a simple semi-circular path in the region marked 8 without being caused to run longitudinally over a short distance parallel with the centre line C—C.

FIG. 3 shows the cord assembly at the edge of the fabric as being substantially one cord diameter in thickness, with the longitudinal edge region 6 held in position by unvulcanised rubber compound 9 which is impressed into the cord assembly by a consolidating means.

Whilst in the preferred mode of construction the acute angle made between successive cords running obliquely over a central region of the fabric from edge 5 to edge 5' of the fabric and the circumferential centre line C—C is 21 degrees, this angle may be selected within a range of from eighteen to ninety degrees without loss of the desired properties.

Figure 4:
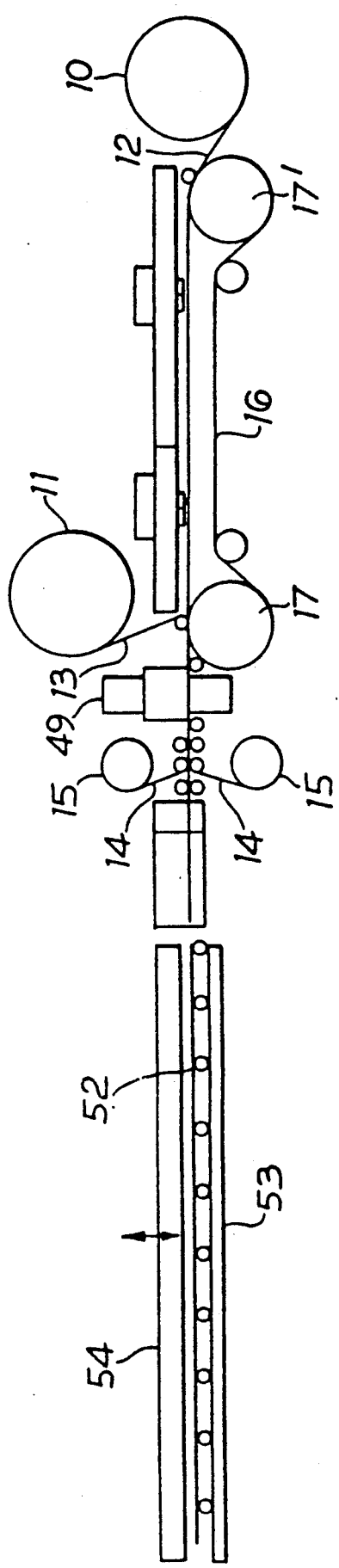
FIG. 4 is a side view of a fabric making apparatus according to the invention.
Figure 5:
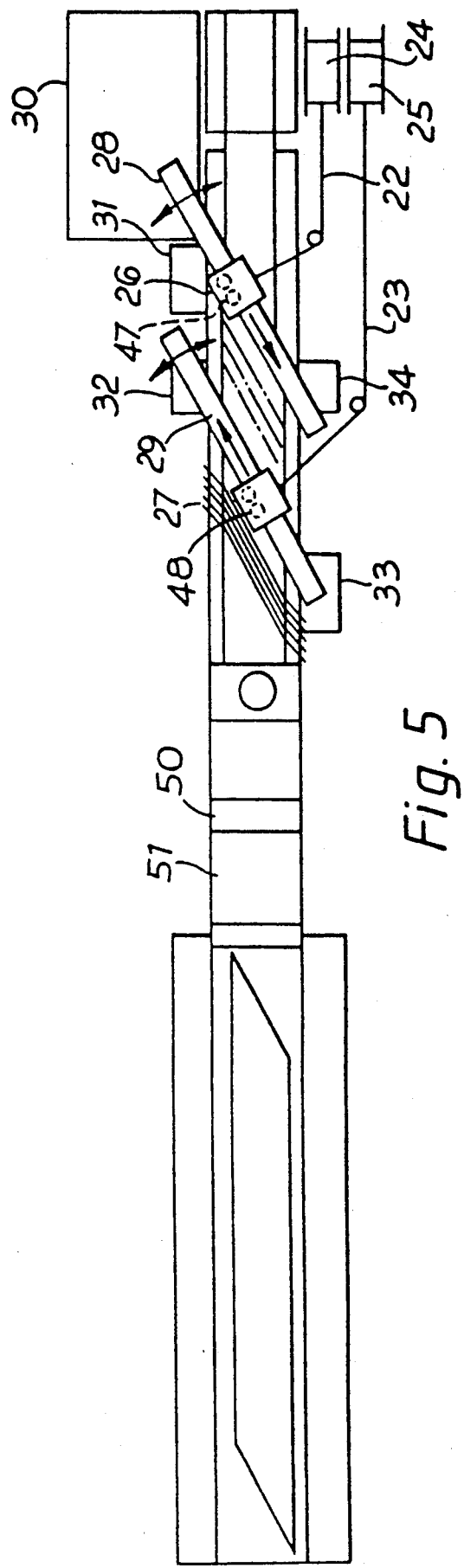
FIG. 5 is a plan view of the apparatus shown in FIG. 4, and FIGS. 6, 7, 8 and 9 are fragmentary plan views showing various stages of winding the cord reinforcements.

The apparatus for manufacturing a breaker fabric incorporating either of the breaker fabric reinforcements shown in FIGS. 1 and 2 is illustrated in FIGS. 4 and 5. The apparatus incorporates feed means in the form of an elastomeric sheet let-off device 10 situated at one end of the apparatus and incorporating a constant tension unit (not shown) for supplying the lower rubber film 12. A similar let-off device 11 is provided for supplying the upper rubber film 13.

Each of the rubber films 12, 13 may be backed by a layer of lining material 14 such as polyvinyl-chloride to act as an adhesion insulating medium whilst in the roll and to support the rubber film during the wire cord laying operation. The lining material 14 is removed from the upper and lower rubber films by two driven liner batching units 15 situated one above the line of the breaker fabric and the other below. These driven units maintain a constant tension in the liners through the utilisation of torque limiters (not shown).

Construction of the reinforced breaker fabric is carried out on a conveyor 16 which preferably consists of two stainless steel endless belts. arranged side-by-side relative to one another and capable of being adjusted to vary their combined overall width. Thus a range of breaker widths may be accommodated. The belts are driven via the drum 17 around which they extend from a second drum 17' by an indexing means (not shown) which is capable of imparting a variable linear motion to the belts to suit the required breaker material specification. It will be seen later in this example that the belts will index alternately 3 pitch lengths of cord, measured along the longitudinal axis C—C of the breaker and by then to one pitch length of cord.

Mounted adjacent to each outer edge of the belts and adjustable with them are a pair of blades (hereinafter, respectively second, third, fourth and first blades), 18, 19, 20, 21 (see FIG. 7). These serve as support means and are used for holding the wire cords during the wire laying operation whilst the outer edge regions 6 and 8 are formed. Second and fourth blades 18, 20 are used for forming edge regions 6 and third and first blades 19, 21 utilised for forming edge regions 8.

First and second blade support means 18 and 21 are operatively associated with first laying head means and third and fourth blade support means 19 and 20 are operatively associated with the second laying head means. Second blade support means 18 is of longer extent in the direction of movement of the polymeric material then the first blade support means 21. Likewise, fourth blade support means 20 is of longer extent than third blade support means 19. Also, each of the first and third blade support means 21 and 19 are located nearer the longitudinal centerline of the polymeric material than respective second and fourth blade support means 18 and 20. All blades are arranged to rise and fall in sequence during the cord laying operation.

In the cord laying operation two wire cords 22 and 23 are drawn out respectively from standard reels 24 and 25 (see FIG. 5). The reels are mounted on braked shaft means so as to impart a known tension which can be varied to suit the operation and the whole is mounted in a temperature controlled environment.

The cords 1, 2 are fed to two laying head means in the form of carriages 26, 27 mounted respectively on slideways 28, 29 in such a manner that the carriages are able to travel obliquely across the upper face of the lower rubber film 12 at the specified bias angle. Also mounted on each laying head carriage 26, 27 is a respective pair of laying rollers 47, 48 which guide a respective cord along an oblique path which extends at the above referred to angle A of 21 degrees. A swing-over pressure roller (not shown) may be mounted on each carriage to embed the wires into the rubber film 12.

The slideways 28, 29 are capable of rotating about a machine centre line to permit change of the bias angle when required. The carriages 26, 27 are made to traverse along their slideways 28, 29 by a drive unit 30 which is mechanically linked to the conveyor indexing drive. Both carriages are mechanically linked together, for example by two racks and a common pinion (not shown) such that they travel across the conveyor simultaneously but in opposite directions.

Figure 6:
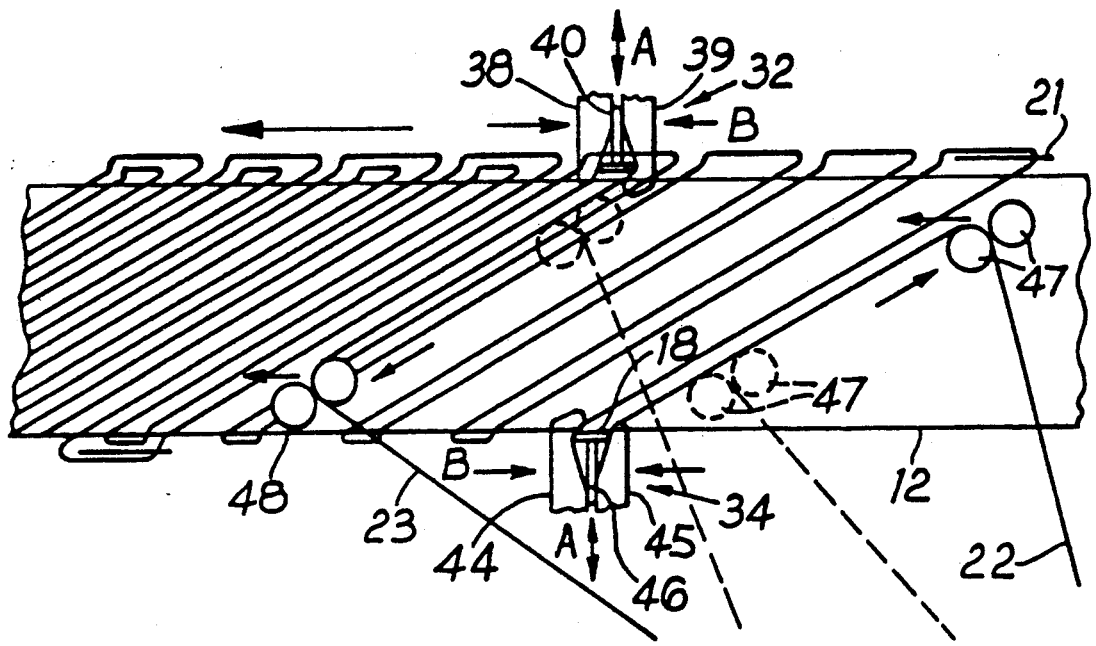
Figure 7:
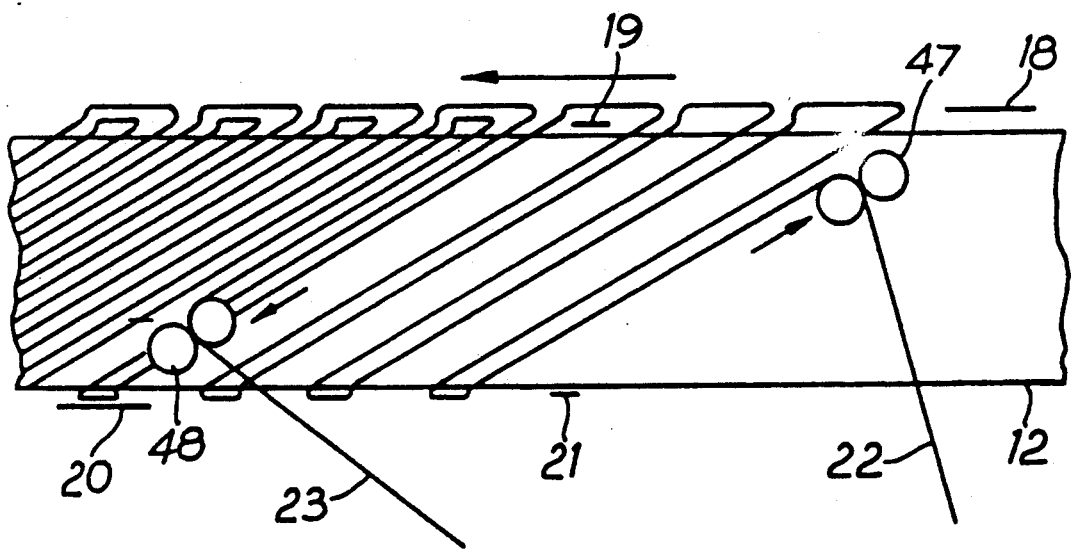
Figure 8:
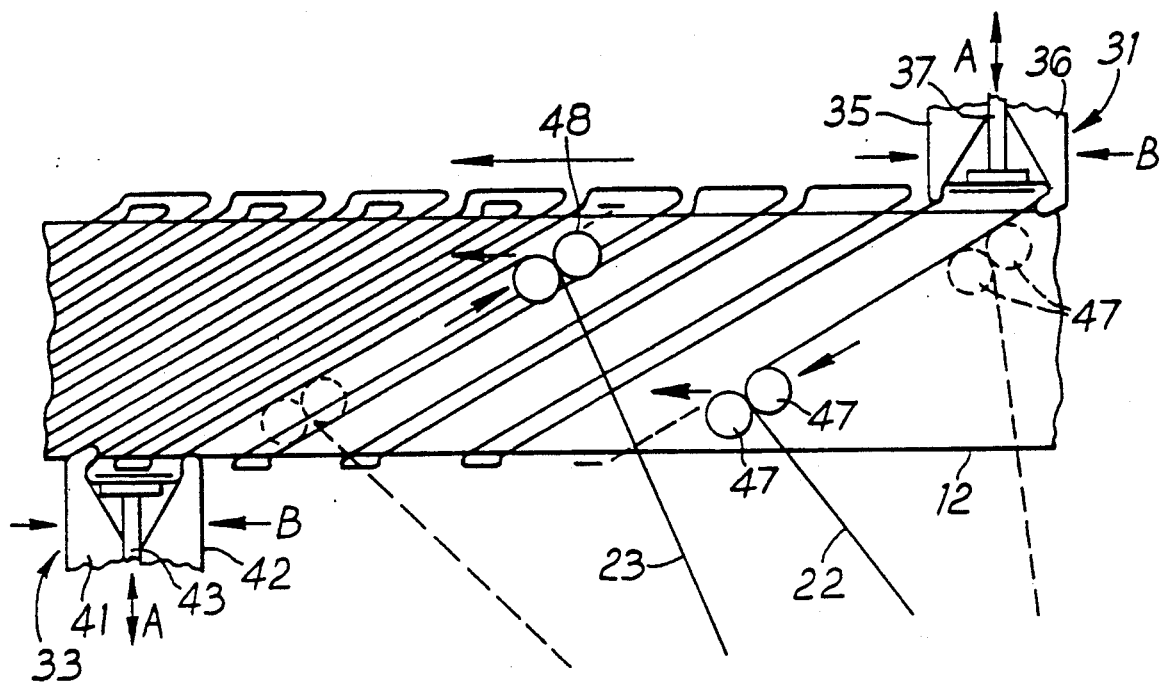
Figure 9:
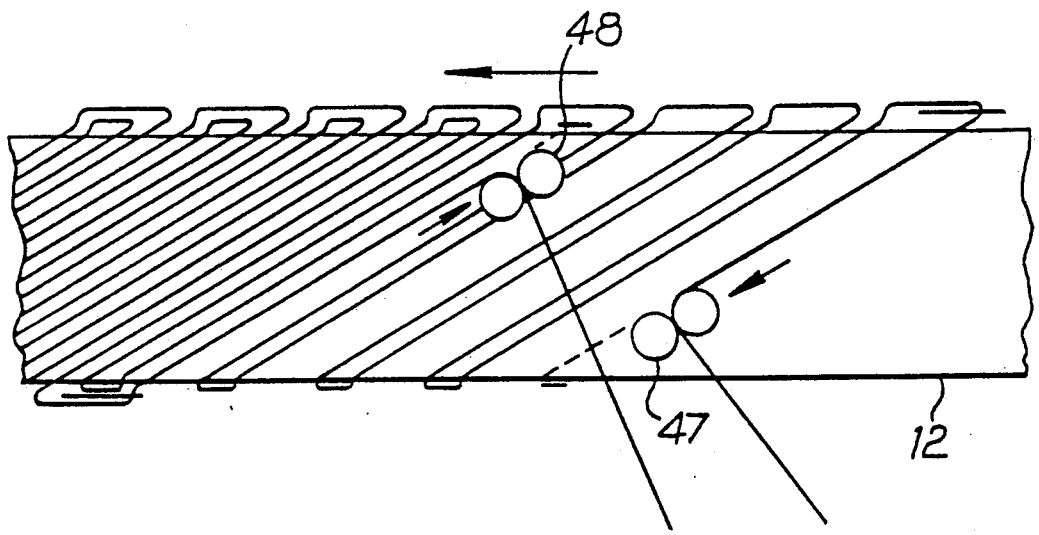

Wire forming assemblies 31, 32, 33 and 34 (see FIG. 5) are mounted adjacent to the four blade assemblies 18, 19, 20 and 21 (see FIG. 7). They contain wire deforming means which is capable of moving towards or away from the blades on centre lines at right angles to the centre line of the apparatus, i.e. in the directions of the arrows A of FIGS. 6 and 8. Mounted in the forming assembly 31 (see FIG. 8) are a pair of jaws 35 and 36 and a plunger 37. Similarly in the forming means 32, 33 and 34 are mounted jaws 38, 39, 41, 42, 44 and 45, respectively, and plungers 40, 43 and 46, respectively (see FIGS. 6 and 8). The jaws of each assembly are operable to move toward or away from one another in the directions of the arrows B of FIGS. 6 and 8, being the longitudinal direction of movement of the fabric reinforcement through the apparatus. The jaws and plungers may be operated by pneumatic or hydraulic means to coincide with the wire laying sequence and to impart a permanent set in the cords.

Also mounted in the forming assembly 31 is a vertically operated clamp means (not shown) which clamps a wire cord to the lower rubber film 12 and conveyor when the blade 18 is retracted. The clamp also holds the wire firmly in place during the indexing movement of the belts and until the cord on the opposite side of the breaker material has been formed around first blade 21, whereupon it releases the cord and is reset to its original position above second blade 18.

Similarly mounted in forming assemblies 32, 33 and 34 are vertically operated clamps for holding the cords at third, fourth and first blades 19, 20 and 21, respectively.

The cord wind laying sequence of the apparatus operates as follows:

Referring to FIGS. 6, 7, 8 and 9 and considering the operation of laying one cord only, (the second cord being laid simultaneously and the apparatus performing in a similar but complimentary manner about the centre line C—C), the sequence is:

Starting from the position shown in FIG. 6, cord 22 is drawn out from a reel and fed through the two guide rollers 47 when in the position shown in dotted lines. Wire forming assembly 34 operates to shape the wire cord 22 around first blade 21, jaws 44 and 45 open and the assembly moves away from the edge of the conveyor leaving the cord secured on the blade. When the carriage 26 almost reaches the position where the rollers 47 are shown in full in FIG. 6 the first blade 21 lowers and simultaneously the wire clamp (not shown) operates to secure the wire cord 22 onto the rubber film 12. The carriage laying rollers clamp and the conveyor indexes forward three pitches of wire which lines up the carriage in readiness for winding the cord around second blade 18, shown in FIG. 7. The carriage moves past the second blade position and the blade 18 is then raised at the same time that the laying rollers retract three pitches, thus hooking the wire onto the blade. The carriage changes direction and starts its next run. At the position of the laying rollers 47 shown in dotted lines in FIG. 8 the wire forming assembly 31 operates around second blade 18. Jaws 35 and 36 open and the assembly moves away from the edge of the conveyor, leaving the cord secured to the second blade 18.

The carriage 26 continues on its path toward first blade 21 and just prior to reaching the position shown in full lines second blade 18 lowers and simultaneously the wire clamp operates to secure the wire to the rubber film 12. The carriage laying rollers clamp and the conveyor indexes forward one pitch of the wire. This lines up the laying rollers 47 in readiness for winding the cord around first blade 21. The carriage 26 continues its path past first blade 21 which then rises and the laying rollers move back one pitch, thus hooking the cord around the second blade 18 shown in FIG. 6. The sequence is then repeated as above for both of the cords 1, 2 to construct the desired length of fabric reinforcement.

Having been laid and rolled into the lower rubber film the breaker cords are progressed to the end of the belts 16 where the upper rubber film 13 is laid onto the cords. The resulting fabric material then passes under a consolidator 49 which impregnates the two rubber films into interstices between the cords thereby to produce a homogeneous sheet of breaker fabric. The lining material 14 is removed from both sides of the breaker material by means 15 described above. The breaker fabric progresses to an edge folding unit 50, which folds the edges of the top rubber film 13 around the bare wire edges and underneath, to meet the edges of the lower film 12.

The film is then passed through a cutting means 51 which cuts through a measured length of breaker material, following the line of the oblique cords. The cut length is accelerated away from the cutter by rollers 52 and positioned above an awaiting carrier means 53 onto which the breaker may be automatically positioned by utilising an overhead electromagnet 54 to hold the breaker whilst the rollers 52 are withdrawn. The carriage may then transport the cut length of fabric to, for example, a tire building machine in which it is used to form a breaker component.

We claim:

1. A method for the manufacture of a reinforced polymeric article comprising feeding a layer of polymeric material to a conveyor, applying two flexible reinforcing elements to said layer of polymeric material while supported on the conveyor by laying a first of said reinforcing elements to extend successively to and fro across the polymeric material from a first edge region to a second edge region of the conveyor, around a first support means, back to the first edge region, and around a second support means, wherein the second support means is of longer extent in the direction of movement of the polymeric material than the first support means, laying a second of said reinforcing elements to extend successively to and fro across the polymeric material from the second edge region to a first edge region, around the third support means, back to the second edge region, and around a fourth support means, wherein the fourth support means is longer extent in the direction of movement of the polymeric material than the third support means, the two elements being laid in an arrangement in which portions of the second element are caused to lie in spaces between successive portions of the first element extending to and from said first edge region whereby successive portions of each element lie interdigitated with successive portions of the other element in manner free of cross-over of the elements.

2. The method claimed in claim 1, wherein the reinforcing elements are laid at an angle in the range from 18 up to and including 90 degrees relative to the direction of movement of the conveyor.

3. The method claimed in claim 1, wherein the reinforcing elements are laid across the layer of polymeric material whilst the conveyor is at rest.

4. The method claimed in claim 1, wherein said conveyor is operated to advance the polymeric material in a step-wise manner only when the next portion of each element for laying on the polymeric material lies at an edge region of the conveyor.

5. The method claimed in claim 1 wherein the reinforcing elements are laid across the layer of polymeric material whilst the conveyor is moving.

6. The method claimed in claim 1, wherein portions of each element are laid at edge regions in a direction parallel with the direction of movement of the conveyor when the conveyor is moving.

7. The method claimed in claim 1, wherein said reinforcing elements are covered by a second layer of polymeric material, the second layer being applied to sandwich and embed the two reinforcing elements between the two layers of polymeric material.

8. The method claimed in claim 1, further comprising the steps of controlling said conveyor to move in a step-wise manner alternately by a distance corresponding to three pitch lengths of reinforcing element as measured in the direction of movement, and then by a distance of one length of the reinforcing element.

9. Apparatus for the manufacture of a reinforced polymeric article comprising a conveyor for supporting a layer of polymeric material, feed means for supply of a layer of polymeric material to the conveyor, a first laying head means operable to lay a first reinforcing element in a to and fro manner over a layer of polymeric material supported by the conveyor whereby the element extends in a direction at least a component of which lies transverse relative to the direction of movement of the layer of polymeric material on the conveyor, a second laying head means operable to lay a second reinforcing element in said to and fro manner to extend in a direction substantially parallel with the direction in which the first reinforcing element extends over the layer of polymeric material and cooperating with said first laying head means such that successive portions of each element lie interdigitated with successive portions of the other element in a manner free of cross-over of the elements, two pairs of reinforcing element support means, each pair comprising two support means arranged one at each edge of the conveyor, wherein one of the two support means is of a shorter and the other is of a longer extent relative to the direction of movement of the polymeric material and the shorter support means of each pair is located nearer the longitudinal centerline of the polymeric material than the longer, wherein each pair is operatively associated with a respective one of said laying head means, wherein each laying head means reciprocates between the respective shorter and longer support means, and two pairs of holding means, each pair operatively associated with a respective one of said laying head means, to hold a reinforcing element at each edge region of the layer of polymeric material at least during a change in direction of lay of a reinforcing element by said respective laying head means, and each of said holding means is operatively associated with a respective support means.

10. Apparatus as claimed in claim 9 and comprising a second feed means for supply of a second layer of polymeric material.

11. Apparatus as claimed in claim 10, wherein said second feed means is downstream of the two laying head means.

12. Apparatus as claimed in claim 9 wherein each reinforcing element support means has associated therewith clamp means operable to secure a reinforcing element relative to an edge region of the layer of polymeric material.

13. Apparatus as claimed in claim 12, wherein each reinforcing element support means has associated therewith a forming assembly selectively operable to urge a reinforcing element into firm contact with a support means.

14. Apparatus as claimed in claim 13, wherein each support means is independently adjustable thereby to permit ready variation of the bias angle at which reinforcing elements may be laid.

15. Apparatus as claimed in claim 9, wherein the conveyor comprises a pair of endless belts arranged side-by-side.

16. Apparatus as claimed in claim 15, wherein the lateral spacing of the belts is adjustable.

17. Apparatus as claimed in claim 9, further comprising control means for the support means whereby said support means are advanced and retracted in sequence with movement of the laying head means.

* * * * *